US011558599B2

(12) United States Patent
Sato

(10) Patent No.: US 11,558,599 B2
(45) Date of Patent: Jan. 17, 2023

(54) ELECTRONIC APPARATUS, CONTROL METHOD FOR ELECTRONIC APPARATUS, AND NON-TRANSITORY COMPUTER-READABLE STORAGE MEDIUM

(71) Applicant: CANON KABUSHIKI KAISHA, Tokyo (JP)

(72) Inventor: Ayumi Sato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/193,104

(22) Filed: Mar. 5, 2021

(65) Prior Publication Data

US 2021/0289191 A1 Sep. 16, 2021

(30) Foreign Application Priority Data

Mar. 10, 2020 (JP) .............................. JP2020-040817

(51) Int. Cl.
*H04N 13/279* (2018.01)
*H04N 13/282* (2018.01)
*G06F 3/0482* (2013.01)
*G06F 3/04815* (2022.01)
*G06T 7/73* (2017.01)

(52) U.S. Cl.
CPC ......... *H04N 13/279* (2018.05); *G06F 3/0482* (2013.01); *G06F 3/04815* (2013.01); *G06T 7/73* (2017.01); *H04N 13/282* (2018.05)

(58) Field of Classification Search
CPC .... H04N 13/279; H04N 13/282; H04N 5/232; H04N 5/23245; H04N 13/344; G06F 3/04815; G06F 3/0482; G06T 7/73
USPC .......................................................... 348/51
See application file for complete search history.

(56) References Cited

U.S. PATENT DOCUMENTS

| | | | | |
|---|---|---|---|---|
| 2012/0287153 | A1* | 11/2012 | Kashima | H04N 5/23218 |
| | | | | 345/629 |
| 2012/0329527 | A1* | 12/2012 | Kang | H04N 21/472 |
| | | | | 455/566 |
| 2017/0309257 | A1* | 10/2017 | Akita | B60K 35/00 |
| 2017/0329480 | A1* | 11/2017 | Ishikawa | G06F 3/0484 |
| 2018/0150989 | A1* | 5/2018 | Mitsui | H04N 5/232935 |

FOREIGN PATENT DOCUMENTS

JP 2018139096 A 9/2018

* cited by examiner

*Primary Examiner* — Tung T Vo
(74) *Attorney, Agent, or Firm* — Rossi, Kimms & McDowell LLP

(57) ABSTRACT

An electronic apparatus comprising: a processor; and a memory storing a program which, when executed by the processor, causes the electronic apparatus to: acquire a VR image; read viewpoint information indicating a plurality of viewpoints with respect to the VR image; control a display device so that a part of the VR image corresponding to each viewpoint is automatically switched over in order and displayed, on a screen on a basis of the viewpoint information; and change the viewpoint so that a predetermined subject is included in the part of the VR image displayed on the screen.

9 Claims, 11 Drawing Sheets

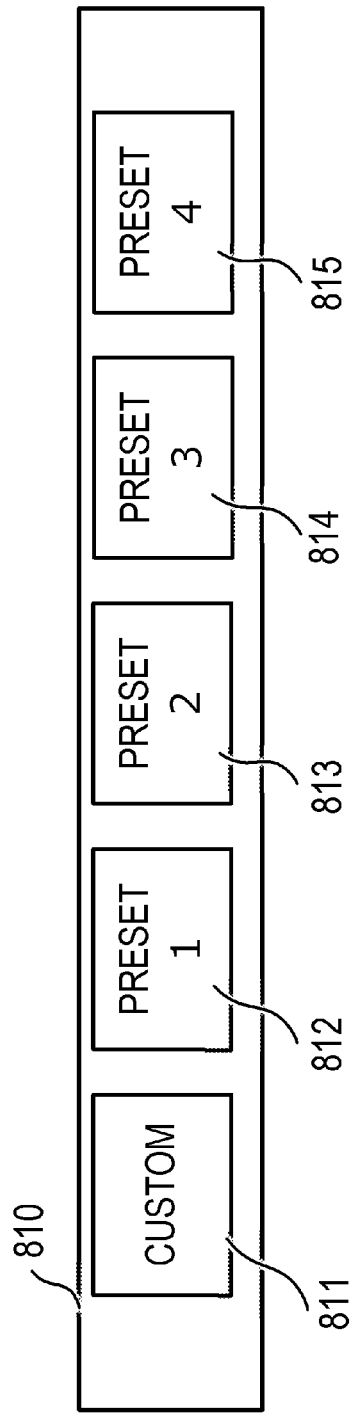

ELECTRONIC APPARATUS, CONTROL METHOD FOR ELECTRONIC APPARATUS, AND NON-TRANSITORY COMPUTER-READABLE STORAGE MEDIUM

BACKGROUND OF THE INVENTION

Field of the Invention

The present invention relates to an electronic apparatus, a control method for the electronic apparatus, and a non-transitory computer-readable storage medium.

Description of the Related Art

In recent years, imaging apparatuses capable of capturing images such as omnidirectional images and entire celestial sphere images having a video range wider than that of a person's viewing angle have become more prevalent.

Further, there has been known a method in which a part of such an image of a wide range video is displayed on a display and the range (display range) of the video displayed on the display is changed according to a change in the posture of an imaging apparatus to implement a display that presents a high immersive feeling or a high realistic sensation.

Japanese Patent Application Laid-open No. 2018-139096 discloses a technology in which a user sets viewpoint information, such as the movement of a viewpoint and a display magnification with respect to an entire celestial sphere image, to perform animation display of the entire celestial sphere image according to the viewpoint information.

However, Japanese Patent Application Laid-open No. 2018-139096, discloses a case where an animation display is not performed as intended by a user when the user intends to utilize viewpoint information that has been applied to one entire celestial sphere image to another entire celestial sphere image.

SUMMARY OF THE INVENTION

Accordingly, it is an object of the present invention to provide a technology capable of appropriately applying information, which has been applied to perform animation display of one image, to the animation display of another image.

An aspect of the present invention is: an electronic apparatus comprising: a processor; and a memory storing a program which, when executed by the processor, causes the electronic apparatus to: acquire a VR image; read viewpoint information indicating a plurality of viewpoints with respect to the VR image; control a display device so that a part of the VR image corresponding to each viewpoint is automatically switched over in order and displayed, on a screen on a basis of the viewpoint information; and change the viewpoint so that a predetermined subject is included in the part of the VR image displayed on the screen.

Further features of the present invention will become apparent from the following description of exemplary embodiments with reference to the attached drawings.

BRIEF DESCRIPTION OF THE DRAWINGS

FIG. 8A is a view showing a menu;

FIG. 8B is a view showing a management table; and

DESCRIPTION OF THE EMBODIMENTS

Figure 1A:
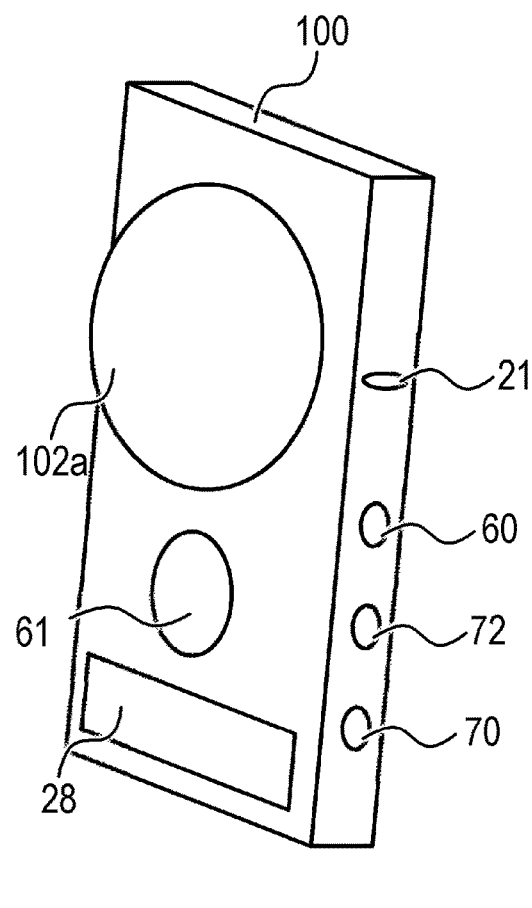
FIGS. 1A and 1B are appearance views of a digital camera.
Figure 1B:
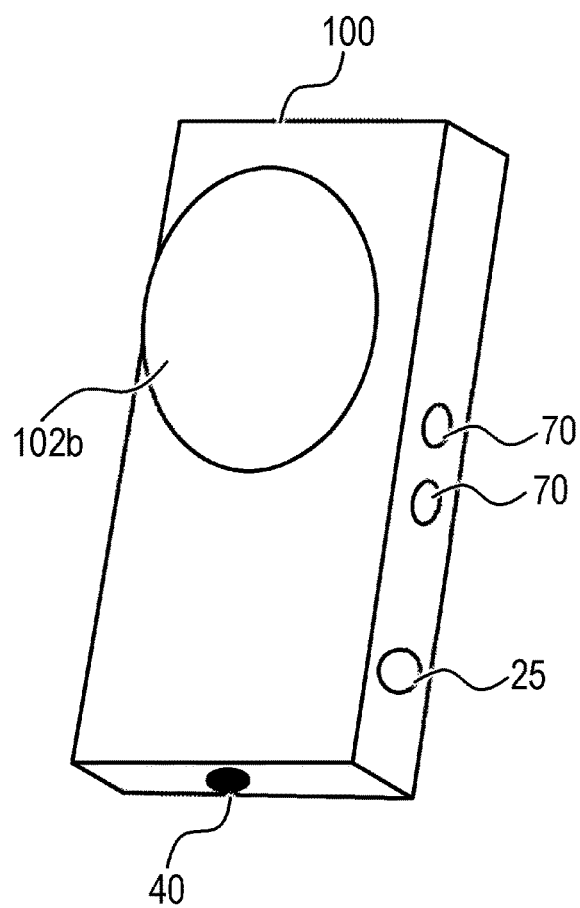

Hereinafter, preferred embodiments of the present invention will be described with reference to the drawings. FIG. 1A shows a front perspective view (appearance view) of a digital camera 100 (imaging apparatus) that is an electronic apparatus. FIG. 1B shows a back-perspective view (appearance view) of the digital camera 100. The digital camera 100 is an omnidirectional camera (entire celestial sphere camera).

A barrier 102a is a protection window of a photographing lens 103a for a camera unit a that assumes the front side of the digital camera 100 as a photographing range. The outside surface of the photographing lens 103a itself may serve as a barrier. The camera unit a is a wide-angle camera that assumes a wide range of at least 180 degrees in up-and-down and left-and-right directions on the front side of the digital camera 100 as a photographing range. A barrier 102b is a protection window of a photographing lens 103b for a camera unit b that assumes the back side of the digital camera as a photographing range. The outside surface of the photographing lens 103b itself may serve as a barrier. The camera unit b is a wide-angle camera that assumes a wide range of at least 180 degrees in up-and-down and left-and-right directions on the back side of the digital camera 100 as a photographing range.

The display unit 28 is a display unit that displays various information. A shutter button 61 is an operation unit used to provide photographing instructions. A mode selection switch 60 is an operation unit used to select various modes. A connection I/F 25 is a connector between a connection cable for connection with an external apparatus such as a smartphone, a personal computer, and a TV set and the digital camera 100. The operation unit 70 is an operation unit including operation members such as various switches, a button, a dial, and a touch sensor that receive various operations from a user. A power switch 72 is a press button used to select between a power-on state and a power-off state.

A light-emitting unit 21 is a light-emitting member such as a light-emitting diode (LED) and notifies a user of various states of the digital camera 100 through light-emitting patterns or light-emitting colors. A fixation unit 40 is, for example, a tripod screw hole and is a member used to fix the digital camera 100 to a fixation item such as a tripod to be installed.

Figure 2:
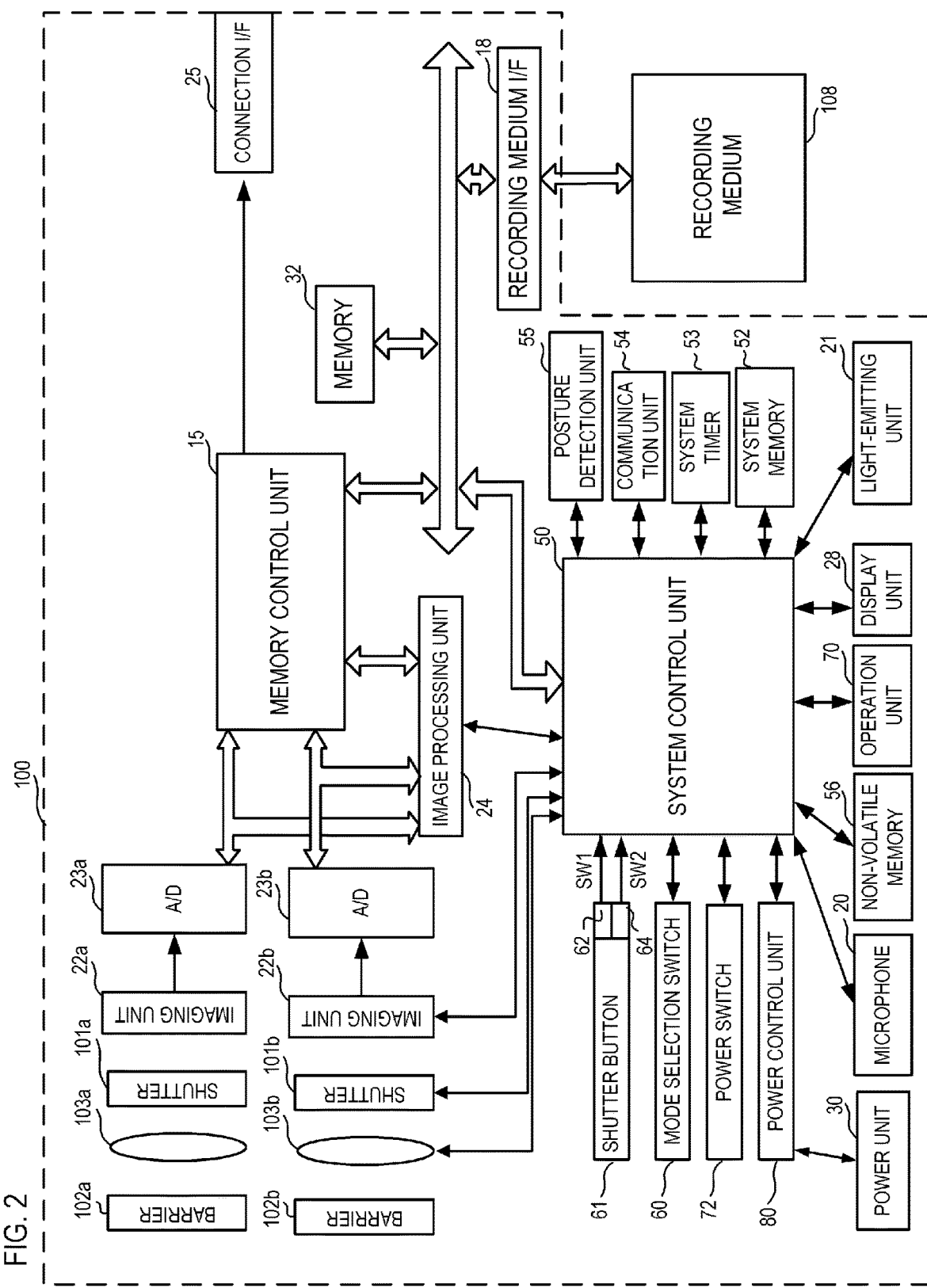
FIG. 2 is a configuration view of the digital camera.

FIG. 2 is a block diagram showing a configuration example of the digital camera 100. The barrier 102a covers the imaging system of the camera unit a including the photographing lens 103a of the digital camera 100 to prevent the stain or damage of an imaging system including the photographing lens 103a, a shutter 101a, and an imaging unit 22a. The photographing lens 103a is a lens group including a zoom lens and a focus lens and is a wide-angle lens. The shutter 101a is a shutter having an aperture function to adjust the amount of subject light incident on the imaging unit 22a. The imaging unit 22a is an imaging element including a CCD element, a CMOS element, or the like that converts an optical image into an electric signal. An A/D converter 23a converts an analog signal output from the imaging unit 22a into a digital signal.

The barrier 102b covers the imaging system of the camera unit b including the photographing lens 103b of the digital camera 100 to prevent the stain or damage of an imaging system including the photographing lens 103b, a shutter 101b, and an imaging unit 22b. The photographing lens 103b is a lens group including a zoom lens and a focus lens and is a wide-angle lens. The shutter 101b is a shutter having an aperture function to adjust the amount of subject light incident on the imaging unit 22b. The imaging unit 22b is an imaging element including a CCD element, a CMOS element, or the like that converts an optical image into an electric signal. An A/D converter 23b converts an analog signal output from the imaging unit 22b into a digital signal.

A VR image is captured by the imaging units 22a and 22b. The VR image is an image capable of being displayed in VR. The VR image includes an omnidirectional image (entire celestial sphere camera image) captured by an omnidirectional camera (entire celestial sphere camera camera), a panorama image having a video range (effective video range) wider than a display range displayable on a display unit at a time, or the like. The VR image includes not only a static image but also a moving image and a live-view image (an image acquired from a camera in almost real time). The VR image has a video range (effective video range) corresponding to a visual field of 360 degrees in a top-bottom direction (a vertical angle, an angle from a zenith, an elevation angle, a depression angle, and an altitude angle) and 360 degrees in a left-right direction (a horizontal angle and a direction angle) at a maximum. Further, the VR image includes an image that falls within a range less than 360 degrees in a top-bottom direction and less than 360 degrees in a left-right direction but has a field angle (visual-field range) wider than a field angle at which the photographing of an image is made possible by a general camera or has a video range (effective video range) wider than a display range at which an image is displayable on a display unit at a time. For example, an image photographed by an entire celestial sphere camera capable of photographing a subject by an amount corresponding to a visual field (a field angle) of 360 degrees in a left-right direction (a horizontal angle, an azimuth angle) and a vertical angle of 210 degrees about a zenith is a type of the VR image. Under the VR display of the VR image (a display mode: displayed in a "VR view"), seamless omnidirectional video is viewable in the left-right direction (in a horizontal rotation direction) when the posture of a display apparatus is changed in a left-right rotation direction. In a top-bottom direction (vertical rotation direction), seamless omnidirectional video is viewable within a range of ±105 degrees when seen from right above (a zenith). However, a range exceeding 105 degrees from a right-above position is a blank region in which no video is present. Further, for example, an image photographed by a camera capable of photographing a subject by an amount corresponding to a visual field (field angle) of 180 degrees in a left-right direction (a horizontal angle, an azimuth angle) and a vertical angle of 180 degrees about a horizontal direction is a type of the VR image. That is, an image having a video range corresponding to a visual field of at least 160 degrees (±80 degrees) in each of the top-bottom direction and the left-right direction and having a video range wider than a range visually recognizable by a person at a time is a type of the VR image. In other words, the VR image is an "image in which a video range is at least a part of virtual space (VR space)".

The VR display (VR view) is a display method (display mode) capable of changing a display range in which video in a visual-field range according to the posture of a display apparatus among VR images is displayed. When a user watches video while wearing a head-mounted display (HMD) that is a display apparatus, the video in a visual-field range according to the direction of the face of the user is displayed. For example, it is assumed that among VR images, the video of a viewing angle (field angle) about zero degree (a specific direction, for example, north) in a left-right direction and 90 degrees (90 degrees from a zenith, that is, horizontal) in a top-bottom direction at a certain time is displayed. When the posture of the display unit is inverted (for example, when the direction of a display surface is changed from south to north) in this state, a display range is changed to the video of a viewing angle about 180 degrees (an opposite direction, for example, south) in the left-right direction and 90 degrees (horizontal) in the top-bottom direction among the same VR images. That is, when the user watches video while wearing a HMD, video displayed on the HMD is also changed from the video of north to the video of south if the user turns his/her face from the north to the south (that is, when the user turns around). Under such a VR display, the user is allowed to visually have a feeling as if he/she was in an actual place in a VR image (VR space). It can be said that a smartphone attached to a VR goggle (head-mounted adapter) is a type of a HMD. Note that a method for displaying a VR image is not limited to the above. A display range may be moved (scrolled) according to a user operation on a touch panel, a direction button, or the like instead of a change in posture. When video is displayed under a VR display (VR view mode) as well, a display range may be changed according to a touch-move operation on a touch panel or a drug operation on an operation member such as a mouse in addition to a change in the display range due to a change in posture.

An image processing unit 24 performs resize processing such as predetermined pixel interpolation and reduction or color conversion processing on data from the A/D converters 23a and 23b or data from a memory control unit 15. Further, the image processing unit 24 performs predetermined computation processing using captured image data. A system control unit 50 performs exposure control and ranging control on the basis of a computation result obtained by the image processing unit 24. Thus, automatic focus (AF) processing, automatic exposure (AE) processing, electronic flash pre-emission (EF) processing of a through the lens (TTL) system are performed. In addition, the image processing unit 24 performs predetermined computation processing using captured image data and performs automatic white balance (AWB) processing of the TTL system on the basis of an obtained computation result. Further, the image processing unit 24 applies basic image processing to two images (fish-eye images) obtained from the A/D converters 23a and 23b and then combines the images with each other (image connection processing) to generate a single VR image. In the image connection processing of two images, the image processing unit 24 calculates a deviation amount between a reference image and a comparison image for each area by pattern matching processing to detect a connection position in each of the two images. Then, in consideration of the detected connection positions and respective optical-system lens characteristics, the image processing unit 24 performs distortion correction on each of the two images by geometric conversion to be converted into images of an entire celestial sphere image form. By blending the two images of the entire celestial sphere image form with each other, the image processing unit 24 finally generates one entire celestial sphere image (VR image). The generated entire celestial sphere image (VR image) is an image using, for example, equidistant cylindrical projection, and the positions of respective pixels are allowed to correspond to the coordinates of the front surface of a spherical body. Further, during a VR display or reproduction at a live view, the image processing unit 24 performs image cutout processing, enlargement processing, distortion correction processing, or the like to display a VR image in VR and performs rendering to draw the image in the VRAM of a memory 32.

Output data from the A/D converters 23 is written in the memory 32 via the image processing unit 24 and the memory control unit 15 or via the memory control unit 15. The memory 32 stores image data that is obtained by the imaging units 22 and converted into digital data by the A/D converters 23 or images that are output to an external display from the connection I/F 25. The memory 32 includes sufficient storage capacity to store a predetermined number of static images or moving images and sound for a predetermined time.

Further, the memory 32 serves also as a memory (video memory) for an image display. Data for an image display that is stored in the memory 32 is capable of being output from the connection I/F 25 to an external display. When VR images that are captured by the imaging units 22a and 22b, generated by the image processing unit 24, and stored in the memory 32 are sequentially transferred to an external display to be displayed thereon, the external display serves as an electron viewfinder and is allowed to perform a live-view display (LV display). Hereinafter, an image that is displayed in a live-view mode will be called a LV image. Further, when a VR image stored in the memory 32 is transferred to an external apparatus (such as a smartphone) wirelessly connected via a communication unit 54 and displayed on the side of the external apparatus, the external apparatus is also allowed to perform a live-view display (remote LV display).

A non-volatile memory 56 is a memory that serves as an electrically erasable and recordable recording medium, and an EEPROM or the like is, for example, used as such. The non-volatile memory 56 stores a constant, a program, or the like used to operate the system control unit 50. Here, the program represents a computer program used to perform various flowcharts that will be described later in the present embodiment.

The system control unit 50 is a control unit having at least one processor or circuit and controls the whole digital camera 100. The system control unit 50 performs a program recorded on the non-volatile memory 56 described above to realize the various processing of the present embodiment that will be described later. A RAM is, for example, used as a system memory 52. In the system memory 52, a constant and a variable used to operate the system control unit 50, a program read from the non-volatile memory 56, or the like is developed. Further, the system control unit 50 controls the memory 32, the image processing unit 24, and the memory control unit 15 to perform display control.

A system timer 53 is a timing unit that measures time used for various control or time of an embedded clock.

The mode selection switch 60, the shutter button 61, and the operation unit 70 are operation units used to input various operation instructions to the system control unit 50. The mode selection switch 60 switches the operation mode of the system control unit 50 to any of a static-image recording mode, a moving-image photographing mode, a reproduction mode, a communication connection mode, or the like. The static-image recording mode includes an automatic photographing mode, an automatic scene determination mode, a manual mode, an aperture priority mode (Av mode), a shutter speed priority mode (Tv mode), and a program AE mode. Further, the static-image recording mode includes a various-scene mode, a custom mode, or the like that represents photographing settings for each photographing scene. The user is allowed to directly switch to any of the modes by the mode selection switch 60. Alternatively, the user selects any of a plurality of modes displayed on the display unit 28 after once switching to the screen of a list of photographing modes by the mode selection switch 60 and may switch to the selected mode using another operation member. Similarly, the moving-image photographing mode may include a plurality of modes.

A first shutter switch 62 is turned on when the shutter button 61 provided in the digital camera 100 is operated partially or half-pressed (photographing preparation instructions), and generates a first shutter switch signal SW1. According to the first shutter switch signal SW1, the system control unit 50 starts a photographing preparation operation such as automatic focus (AF) processing, automatic exposure (AE) processing, automatic white balance (AWB) processing, and electronic flash pre-emission (EF) processing.

A second shutter switch 64 is turned on when the shutter button 61 is operated completely or fully pressed (photographing instructions) and generates a second shutter switch signal SW2. According to the second shutter switch signal SW2, the system control unit 50 starts the operation of a series of photographing processing from the reading of signals from the imaging units 22 to the writing of image data in the recording medium 108.

Note that the shutter button 61 is not limited to a type that allows a two-step operation including a full-press operation and a half-press operation but may be an operation member that allows only a one-step press operation. In this case, a photographing preparation operation and photographing processing are performed in succession by the one-step press operation. This operation is the same as an operation performed when a shutter button that allows a half-press operation and a full-press operation is fully pressed (an operation performed when the first and second shutter switch signals SW1 and SW2 are generated at almost the same time).

The respective operation members of the operation unit 70 are appropriately assigned functions for each scene when various function icons or alternatives displayed on the display unit 28 are selected and operated, and serve as various function buttons. The function buttons include, for example, an end button, a back button, an image-feed button, a jump button, a narrow-down button, an attribute change button, or the like. For example, various settable menu screens are displayed on the display unit 28 when a menu button is pressed. A user is allowed to intuitively perform various settings by operating the operation unit 70 while watching the menu screen displayed on the display unit 28.

A power control unit 80 is constituted by a battery detection circuit, a DC-DC converter, a switch circuit that switches a block to be energized, or the like, and detects the presence or absence of the installation of a battery, a battery type, and a remaining battery amount. Further, the power control unit 80 controls the DC-DC converter on the basis of the detection results and instructions from the system control unit 50 and supplies a necessary voltage to respective units including the recording medium 108 for a necessary period. A power unit 30 includes a primary battery such as an alkali battery and a lithium battery, a secondary battery such as a NiCd battery, a NiMH battery, and a Li battery, an AC adapter, or the like.

A recording medium I/F 18 is an interface with the recording medium 108 such as a memory card and a hard disk. The recording medium 108 is a recording medium such as a memory card used to record photographed images and is constituted by a semiconductor memory, an optical disk, a magnetic disk, or the like. The recording medium 108 may be a replacement recording medium attachable to and detachable from the digital camera 100 or may be an embedded recording medium.

The communication unit 54 is connected by a wireless or wired cable and performs the transmission and reception of a video signal, a sound signal, or the like. The communication unit 54 is also connectable to a wireless local area network (LAN) or the Internet. The communication unit 54 is capable of transmitting images (including LV images) captured by the imaging units 22a and 22b or images recorded on the recording medium 108. Further, the communication unit 54 is capable of receiving images or various other information from external apparatuses.

A posture detection unit 55 detects the posture of the digital camera 100 in a gravity direction. On the basis of a posture detected by the posture detection unit 55, it is possible to determine whether images photographed by the imaging units 22 are images photographed when the digital camera 100 is held sideways or vertically. Further, it is possible to determine to what extent the digital camera 100 is inclined in the directions of the three axes of yaw, pitch, and roll to photograph images. The system control unit 50 is capable of adding direction information corresponding to a posture detected by the posture detection unit 55 to the image files of VR images captured by the imaging units 22a and 22b or capable of rotating images (adjusting the directions of the images so as to perform inclination correction) and recording the same. As the posture detection unit 55, at least one of an acceleration sensor, a gyro sensor, a geomagnetic sensor, an azimuth sensor, an altitude sensor, and the like may be used in combination. It is also possible to detect the movement (such as panning, tilting, raising, and resting) of the digital camera 100 using an acceleration sensor, a gyro sensor, and an azimuth sensor that constitute the posture detection unit 55.

A microphone 20 is a microphone used to collect sound around the digital camera 100 that is recorded as the moving-image sound of VR images.

The connection I/F 25 is a connection plug for connection with an HDMI (trademark) cable, a USB cable, or the like that is used to be connected to an external apparatus to perform the transmission and reception of video.

Figure 3A:
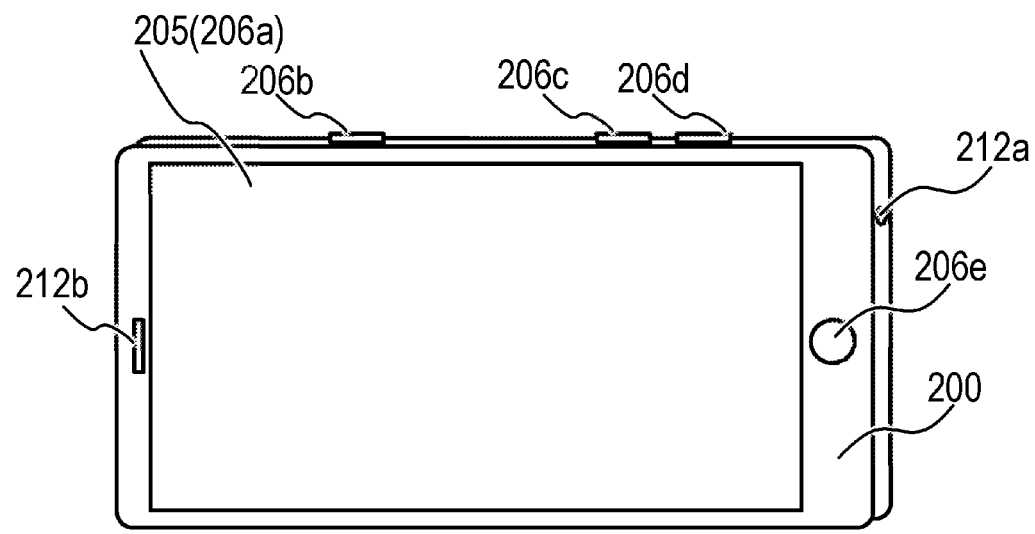
FIGS. 3A to 3C are views showing a display control apparatus.

FIG. 3A shows an example of an appearance view of a display control apparatus 200 that is a type of an electronic apparatus. A display 205 is a display unit that displays an image or various information. The display 205 is configured to be integrated with a touch panel 206a as will be described later and allowed to detect a touch operation on its display surface. The display control apparatus 200 is capable of displaying a VR image (VR content) in VR on the display 205. As shown in FIG. 3A, an operation unit 206 includes the touch panel 206a and operation units 206b, 206c, 206d, and 206e. The operation unit 206b is a power button that receives an operation to switch between the on state and the off state of the power of the display control apparatus 200. The operation units 206c and 206d are volume buttons used to increase and decrease the volume of sound output from a sound output unit 212. The operation unit 206e is a home button used to display a home screen on the display 205. A sound output terminal 212a is an earphone jack and is a terminal that outputs sound to an earphone, an external speaker, or the like. A speaker 212b is a built-in speaker that produces sound.

Figure 3B:
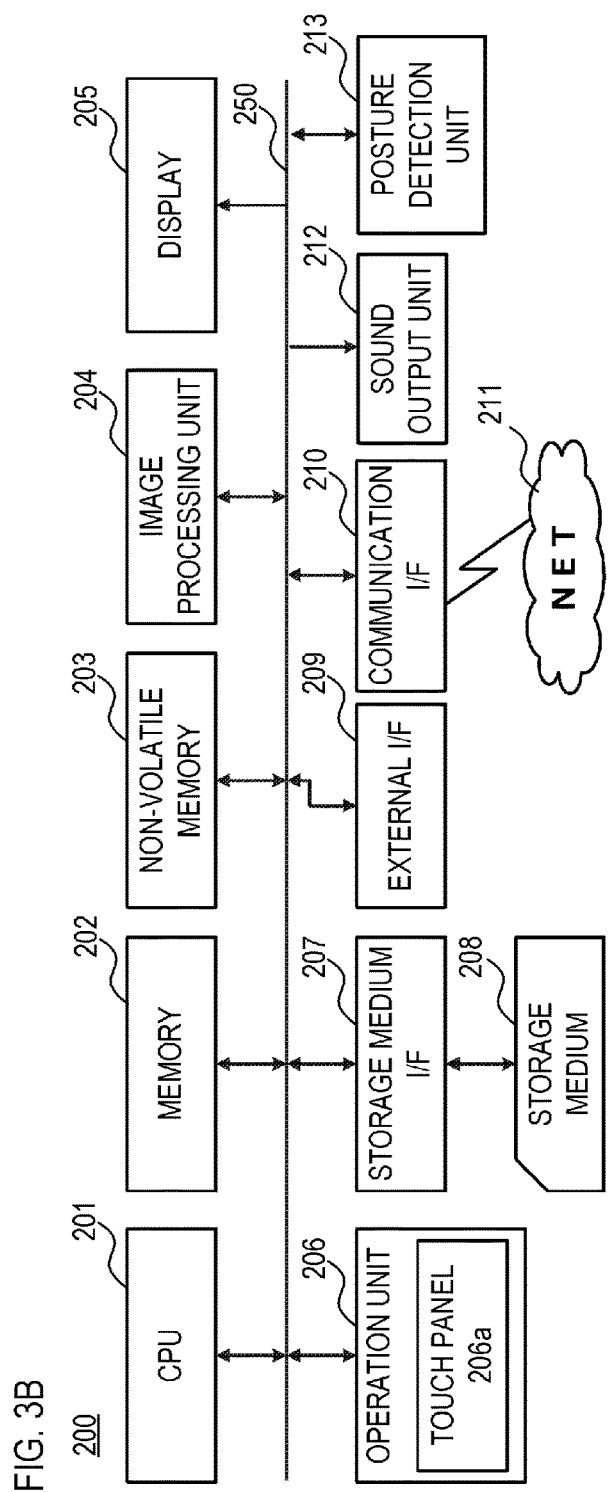

FIG. 3B shows an example of the configuration of the display control apparatus 200. The display control apparatus 200 is capable of being configured by a display apparatus such as a smartphone. A CPU 201, a memory 202, a non-volatile memory 203, an image processing unit 204, a display 205, an operation unit 206, a storage medium I/F 207, an external I/F 209, and a communication I/F 210 are connected to an internal bus 250. Further, a sound output unit 212 and a posture detection unit 213 are connected to the internal bus 250. The respective units connected to the internal bus 250 are capable of exchanging data with each other via the internal bus 250.

The CPU 201 is a control unit that controls the whole display control apparatus 200 and includes at least one processor or circuit. The memory 202 includes, for example, a RAM (such as a non-volatile memory using a semiconductor element). According to, for example, a program stored in the non-volatile memory 203, the CPU 201 controls the respective units of the display control apparatus 200 using the memory 202 as a work memory. The non-volatile memory 203 stores image data, sound data, other data, various programs used to operate the CPU 201, or the like. The non-volatile memory 203 is a storage unit constituted by, for example, a flash memory, a ROM, or the like.

On the basis of the control of the CPU 201, the image processing unit 204 applies various image processing to an image stored in the non-volatile memory 203 or the storage medium 208, a video signal acquired via the external I/F 209, an image acquired via the communication I/F 210, or the like. Image processing performed by the image processing unit 204 includes A/D conversion processing, D/A conversion processing, image-data coding processing, compression processing, decode processing, enlargement/reduction processing (resize), noise reduction processing, color conversion processing, or the like. Further, the image processing unit 204 performs various image processing such as the panorama development, mapping processing, and conversion of a VR image that is an omnidirectional image or a wide-range image that does not have omnidirectional data but has wide-range data. The image processing unit 204 may be constituted by a dedicated circuit block used to apply specific image processing. Further, the image processing unit 204 may not be used depending on the type of image processing. Instead, the CPU 201 may apply image processing according to a program.

On the basis of the control of the CPU 201, the display 205 displays an image, a GUI screen that constitutes a graphical user interface (GUI), or the like. The CPU 201 controls the respective units of the display control apparatus 200 so that a display control signal is generated according to a program and a video signal to be displayed on the display 205 is generated and output to the display 205. The display 205 displays video on the basis of the output video signal. Note that a configuration provided the display control apparatus 200 itself is limited to an interface used to output a video signal to be displayed on the display 205. The display 205 may be constituted by an external monitor (such as a TV set).

The operation unit 206 is an input device used to receive a user operation, the input device including a character-information input device such as a keyboard, a pointing device such as a mouse and a touch panel, a button, a dial, a joystick, a touch sensor, a touch pad, or the like. Note that the touch panel is an input device that is superimposed on the display 205 to be formed in a plane shape and outputs coordinate information corresponding to its contacted position.

The storage medium 208 such as a memory card, a CD, and a DVD is attachable to the storage medium I/F 207. On the basis of the control of the CPU 201, the storage medium I/F 207 performs the reading of data from the attached storage medium 208 or the writing of data in the storage medium 208. The external I/F 209 is an interface that is connected to an external apparatus by a wired cable or wirelessly to perform the input and output of a video signal or a sound signal. The communication I/F 210 is an interface that communicates with an external apparatus, the Internet 211, or the like to perform the transmission and reception of various data such as files and commands.

The sound output unit 212 outputs the sound of a moving image or music data, operation sound, incoming ring tone, various notification sound, or the like. The sound output unit 212 includes the sound output terminal 212a to which an earphone or the like is connected and the speaker 212b but may perform sound output by wireless communication or the like.

The posture detection unit 213 detects the posture of the display control apparatus 200 in the gravity direction or the inclination of the posture with respect to the respective axes of yaw, roll, and pitch. On the basis of a posture detected by the posture detection unit 213, it is possible to determine whether the display control apparatus 200 is held sideways, held vertically, turned upward, turned downward, or put in a slanting position. As the posture detection unit 213, at least one of an acceleration sensor, a gyro sensor, a geomagnetic sensor, an azimuth sensor, an altitude sensor, and the like may be used or a plurality of the sensors may be used in combination.

Note that the operation unit 206 includes the touch panel 206a. The CPU 201 is capable of detecting the following operations or states on the touch panel 206a.

A state in which a finger or a pen that has not touched the touch panel 206a newly touches the touch panel 206a, i.e., the start of a touch (hereinafter called touch-down)

A state in which the touch panel 206a is touched by a finger or a pen (hereinafter called touch-on)

A state in which a finger or a pen moves while touching the touch panel 206a (hereinafter called touch-move)

A state in which a finger or a pen that has touched the touch panel 206a is released from the touch panel 206a, i.e., the end of a touch (hereinafter called touch-up)

A state in which nothing has touched the touch panel 206a (hereinafter called touch-off)

The touch-on is detected simultaneously when the touch-down is detected. Generally, the touch-on is continuously detected unless the touch-up is detected after the touch-down. The touch-on is detected simultaneously when the touch-move is detected. However, even if the touch-on has been detected, the touch-move is not detected unless a touch position has been moved. After the touch-up of all touched fingers or a pen is detected, the touch-off is detected.

The CPU 201 is notified of these operations and states or position coordinates at which a finger or a pen has touched the touch panel 206a via an internal bus. On the basis of notified information, the CPU 201 determines what operation (touch operation) has been performed on the touch panel 206a. For the touch-move, the CPU 201 may also determine the movement direction of a finger or a pen that moves on the touch panel 206a for each of a vertical component and a horizontal component on the touch panel 106a on the basis of the changes of position coordinates. The CPU 201 determines that a slide operation has been performed when detecting the touch-move for at least a prescribe distance. The operation of quickly moving a finger for a certain distance while touching the touch panel 206a and then releasing the same will be called a flick. In other words, the flick is an operation to quickly trace the touch panel 206a so as to be flipped with a finger. The CPU 201 may determine that the flick has been performed when detecting that the touch-move has been performed for at least a predetermined distance and at at least predetermined speed and then the touch-up has been performed in succession to the touch-move (the flick has been performed in succession to the slide operation). In addition, the touch operation of simultaneously touching a plurality of places (for example, two points) and making the touched positions get close to each other will be called pinch-in, and the touch operation of making the touched positions get away from each other will be called pinch-out. The pinch-out and the pinch-in will be generically called a pinch operation (or simply a pinch). The touch panel 206a may be of any type among touch panels such as a resistance film type, a capacitance type, a surface acoustic-wave type, an infrared type, an electromagnetic induction type, an image recognition type, and an optical sensor type. As touch panels, there are a type that detects a touch when a touch panel is touched and a type that detects a touch when a finger or a pen approaches a touch panel. However, any of the touch panels may be used.

Figure 3C:
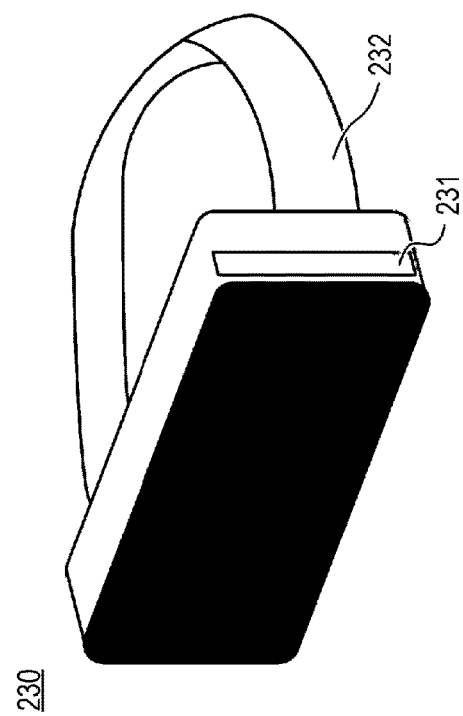

FIG. 3C shows an appearance view of a VR goggle (head-mounted adapter) 230 to which the display control apparatus 200 is attachable. The display control apparatus 200 is capable of being used as a head-mounted display when attached to the VR goggle 230. An insertion port 231 is an insertion port into which the display control apparatus 200 is inserted. The whole display control apparatus 200 may be inserted into the VR goggle 230 with the display surface of the display 205 directed to the side of a head band 232 (that is, on the side of a user) used to fix the VR goggle 230 to the head of the user. By wearing the VR goggle 230 to which the display control apparatus 200 is attached, the user is allowed to visually recognize the display 205 of the display control apparatus 200 while wearing the VR goggle 230 on the head without manually holding the display control apparatus 200. In this case, the posture of the display control apparatus 200 changes as the user moves the head or the whole body. The posture detection unit 213 detects a change in the posture of the display control apparatus 200 at this time, and the CPU 201 performs VR display processing on the basis of the change in the posture. In other words, the posture of the head of the user (a direction in which the eyes of the user are turned) is detected when the posture detection unit 213 detects the posture of the display control apparatus 200 in this case.

Figure 4A:
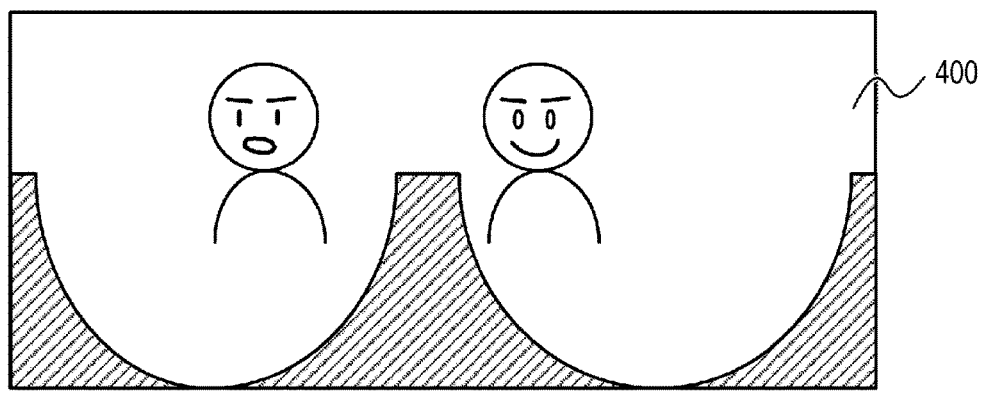
FIGS. 4A to 4C are views for illustrating an animation display.

(Animation Display) Hereinafter, the animation display of an entire celestial sphere image using viewpoint information will be described. In the present embodiment, the animation display represents a display in which the range or/and the position of an image displayed on the display 205 changes. For example, in an entire celestial sphere image as shown in FIG. 4A, the animation display represents such a display that changes according to viewpoint information including information such as a viewpoint position (position information; information on the range of a viewpoint; the range of a viewpoint), an order, and time displayed on the display 205. Specifically, as shown in FIG. 4C, the animation display includes a display in which only one subject (person A) is first displayed, another subject (person B) is then displayed, and the two subjects are finally displayed.

Figure 4B:
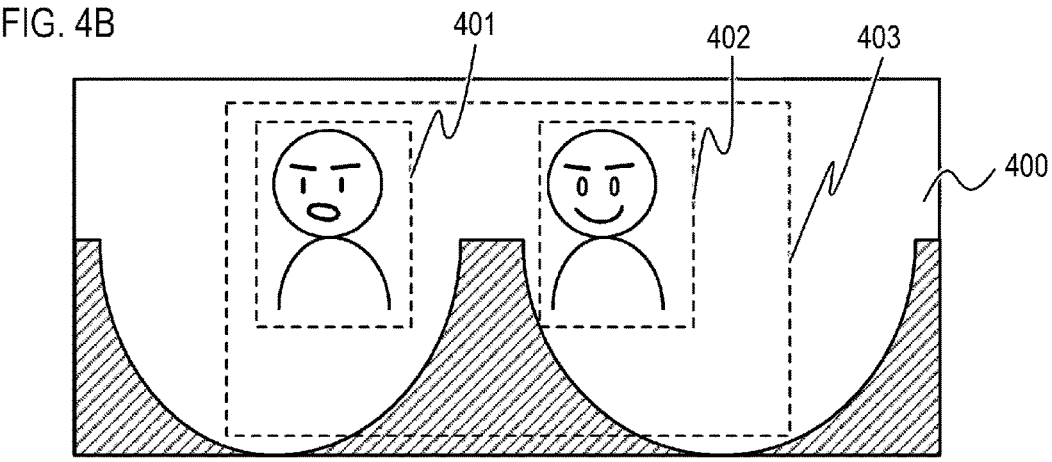
Figure 4C:
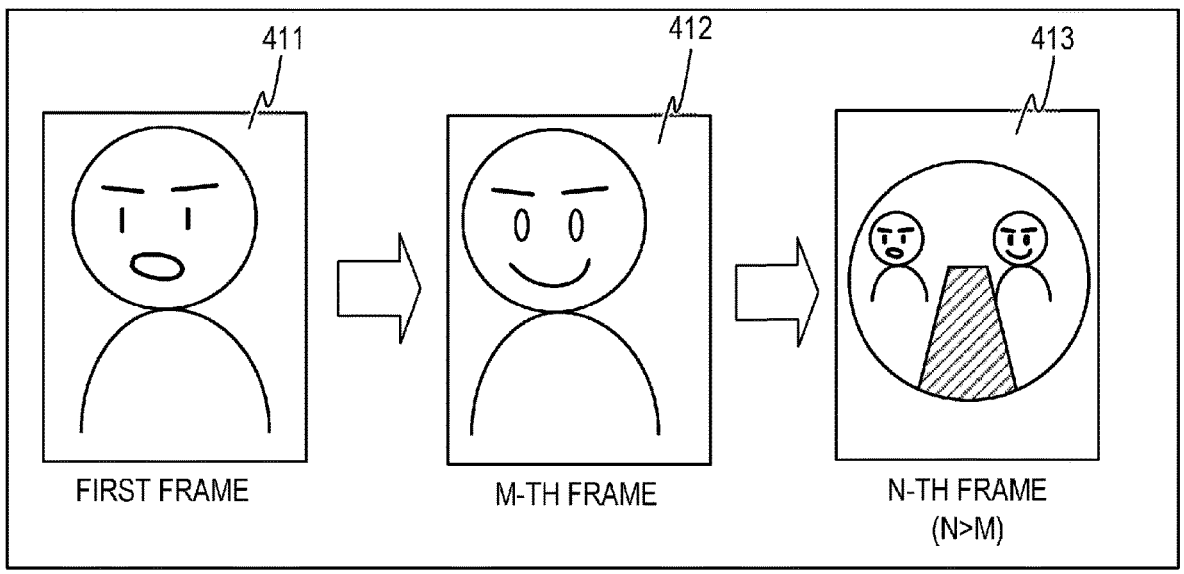

Further, in order to perform the animation display as shown in FIG. 4C, it is necessary to set the above viewpoint information in advance by a user operation. Specifically, as shown in FIG. 4B, a user sets a range that is to be firstly displayed at a viewpoint 401, sets a range that is to be secondly displayed at a viewpoint 402, and sets a range that is to be thirdly displayed at a viewpoint 403. Then, the animation display as shown in FIG. 4C is realized when the set information is applied as viewpoint information to the entire celestial sphere image shown in FIG. 4A. In FIG. 4C, an image 411 is an image obtained by cutting out a range based on viewpoint information corresponding to the viewpoint 401 from the entire celestial sphere image 400 that is a static image. An image 412 is an image obtained by cutting out a range based on viewpoint information corresponding to the viewpoint 402 from the entire celestial sphere image 400 that is a static image. An image 413 is an image obtained by cutting out a range based on viewpoint information corresponding to the viewpoint 403 from the entire celestial sphere image 400 that is a static image. Animation shown in FIG. 4C represents animation that is visually recognized as a moving image that displays the image 411 as the first frame, the image 412 as the M-th frame, and the image 413 as the N-th frame. Note that 1<M<N is established. In the frames between the first frame and the M-th frame, images in ranges cut out from the image 400 so as to smoothly change (change stepwise) from the range based on the viewpoint 401 to the range based on the viewpoint 402 are displayed. In the frames between the M-th frame and the N-th frame, images in ranges cut out from the image 400 so as to smoothly change (change stepwise) from the range based on the viewpoint 402 to the range based on the viewpoint 403 are displayed. In the registration of the viewpoint information as shown in FIG. 4C, there is a possibility that the user has set the viewpoints with attention paid to the persons who are subjects to perform framing so that video changes from the display range of the person A to the display range of the person B and then changes to the display range of both the person A and the person B.

Here, there is a need to apply viewpoint information that has been set in one entire celestial sphere image to another entire celestial sphere image to easily realize an animation display. However, when such viewpoint information is applied to the other entire celestial sphere image, there is a possibility that an animation display not desired by the user is displayed.

Figure 5A:
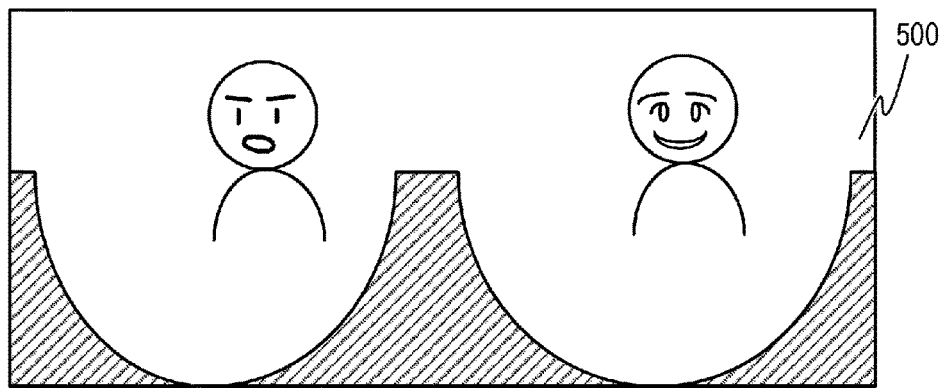
FIGS. 5A to 5C are views for illustrating an animation display.
Figure 5B:
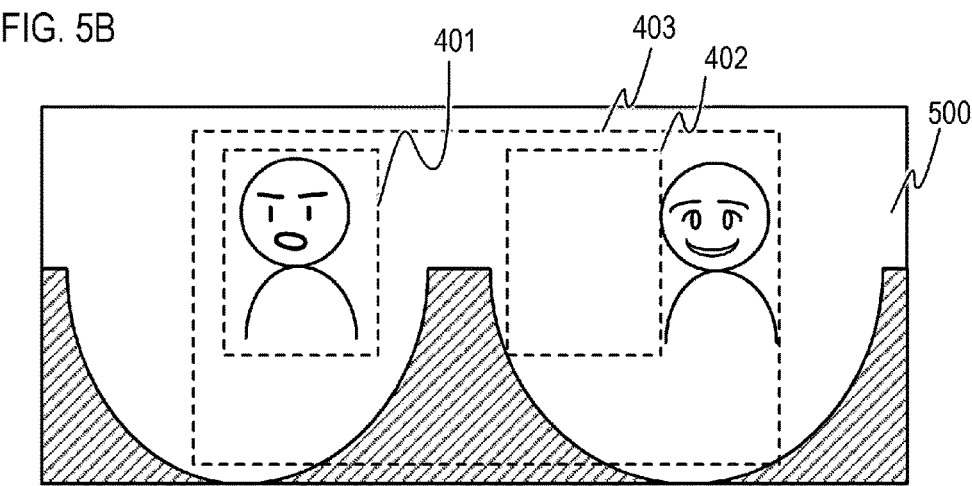
Figure 5C:
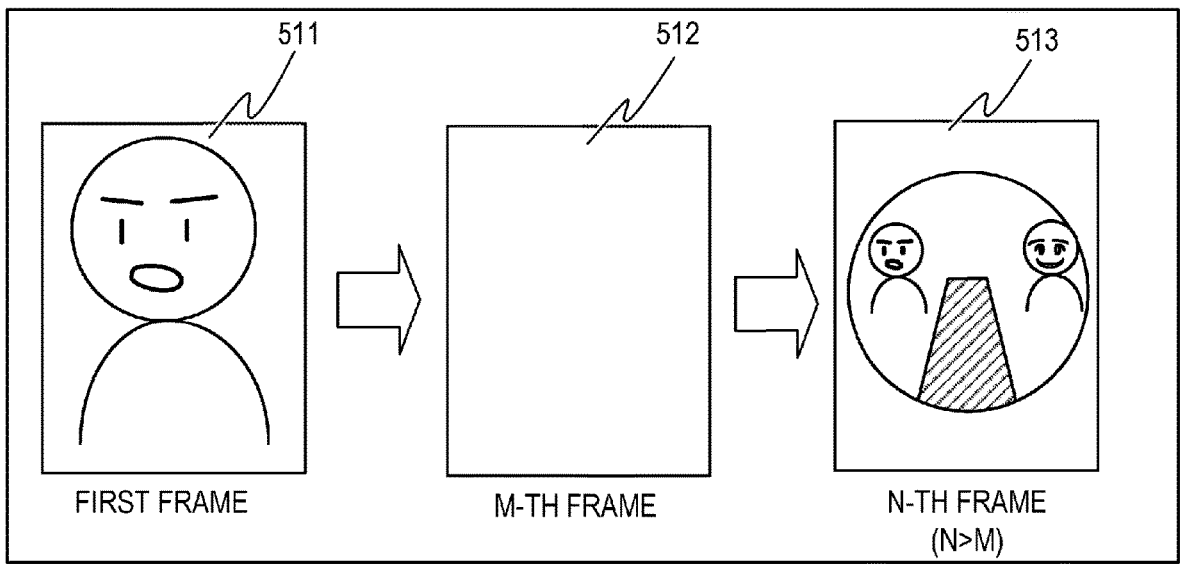

For example, a case in which the viewpoint information that has been set to perform the animation display shown in FIG. 4C with respect to the entire celestial sphere image 400 shown in FIG. 4A is applied to an entire celestial sphere image 500 shown in FIG. 5A is assumed. In this case, the ranges of the entire celestial sphere image 500 corresponding to the ranges shown in the viewpoints 401 to 403 that has been set as shown in FIG. 4B, respectively, are displayed on the display 205 as animation. That is, images 511 to 513 corresponding to the viewpoints 401 to 403 shown in FIG. 5B are displayed in order as the first, M-th, and N-th frames, respectively, in animation as shown in FIG. 5C. Accordingly, since the positions of the reflected subjects are slightly different from each other between the entire celestial sphere image 400 and the entire celestial sphere image 500, a subject (person) that is to be displayed in the M-th frame in an animation display is not displayed as shown in an image 512. That is, this results in animation in which framing is not performed with attention paid to the persons as intended by the user when the viewpoints were set in the image 400.

(Image Reproduction Processing): Hereinafter, image reproduction processing (an image reproduction method; a control method for the display control apparatus 200) in which an appropriate animation display is allowed even when viewpoint information that has been applied to one image is applied to another image will be described. Here, the image reproduction processing will be described using the flowcharts of FIGS. 6A, 6B, and 7.

Figure 6A:
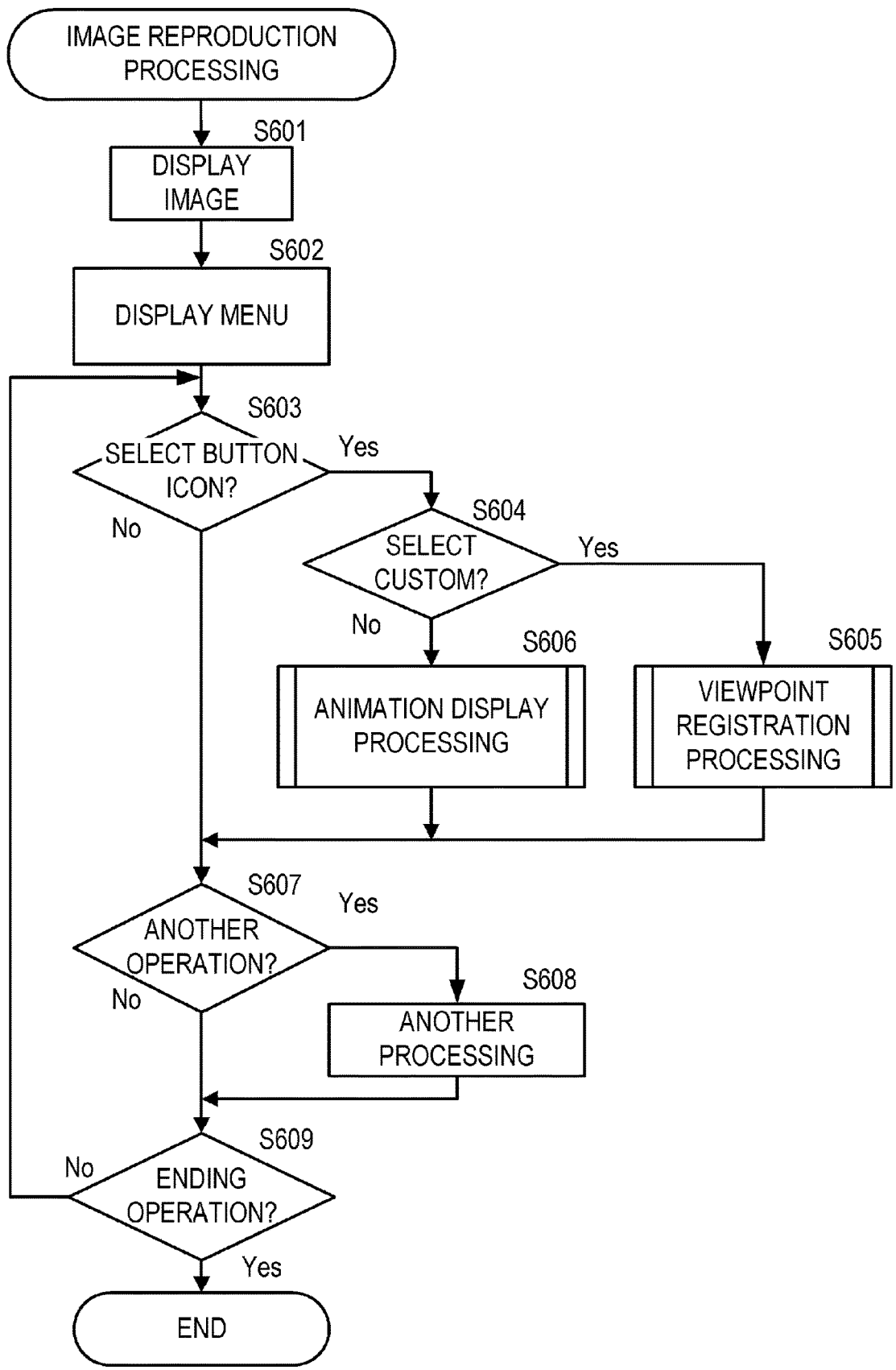
FIG. 6A is a flowchart showing image reproduction processing.
Figure 6B:
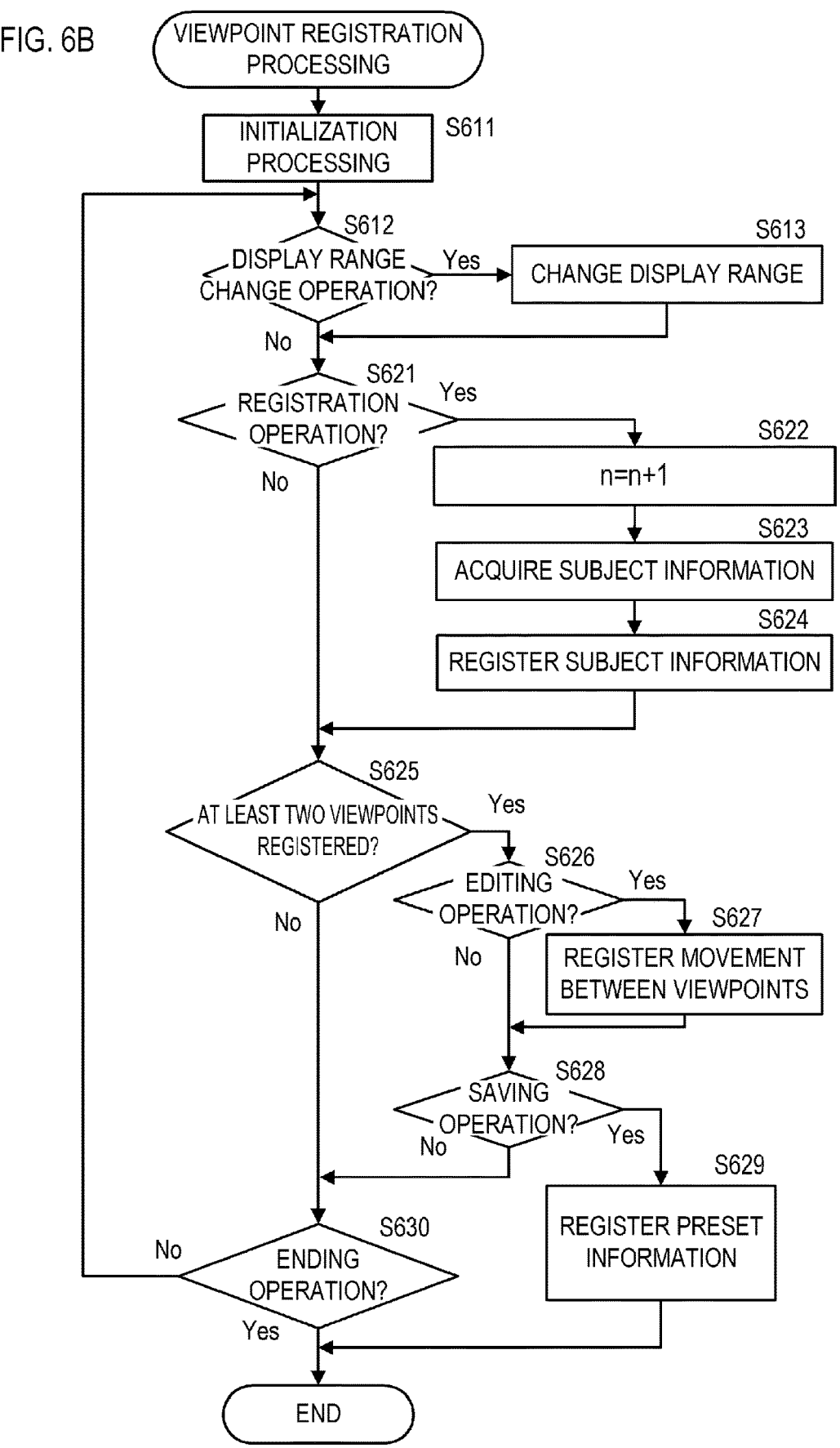
FIG. 6B is a flowchart showing viewpoint registration processing.

FIG. 6A is a flowchart showing the image reproduction processing of the display control apparatus 200 according to the present embodiment. When the operation unit 206b (power button) is operated to turn on the power, the CPU 201 initializes a flag, a control variant, or the like and then starts the image reproduction processing shown in the flowchart of FIG. 6A. Note that the flowchart is realized when the CPU 201 develops a program stored in the non-volatile memory 203 into the memory 202 and performs the same.

In S601, the CPU 201 acquires an image (image data) stored in the storage medium 208 and controls the display 205 so as to display the image. Note that the CPU 201 may display the whole image or may display a range based on a reference direction that is included in the metadata of the image.

For example, the CPU 201 may display the omnidirectional image 400 as shown in FIG. 4A on the display 205 or may display only the image (range) indicated by the viewpoint 401 as shown in FIG. 4B on the display 205.

In S602, the CPU 201 displays a menu 810 so as to be superimposed on the image displayed in S601. In the present embodiment, the menu 810 includes button icons (a custom button 811 and preset buttons 812 to 815) as shown in FIG. 8A. Here, the custom button 811 is a button used to register new viewpoint information. Each of the preset buttons 812 to 815 is a button (a touch button, a button icon, an alternative item, or a menu item) used to apply registered viewpoint information (present information) to an image. Further, viewpoint information (preset information) corresponding to each of the preset buttons 812 to 815 is common information even if the image displayed in S601 is different. Accordingly, viewpoint information used in one image when the preset button 812 is selected for the image and viewpoint information used in another image when the preset button 812 is selected for the other image are the same.

In S603, the CPU 201 determines whether the selective operation of a button icon (a touch on any of the custom button 811 and the preset buttons 812 to 815) to instruct the operation unit 206 to display animation has been performed. The processing proceeds to S604 when the selective operation has been performed. Otherwise, the processing proceeds to S607.

In S604, the CPU 201 determines whether the button that has been selected in S603 is the custom button 811. The processing proceeds to S605 when the custom button 811 has been selected. Otherwise (When any of the preset buttons 812 to 815 has been selected), the processing proceeds to S606.

In S605, the CPU 201 performs viewpoint registration processing that is processing to register viewpoint information. The details of the viewpoint registration processing will be described later using the flowchart of FIG. 6B.

In S606, the CPU 201 performs animation display processing according to the selected preset button. The details of the animation display processing will be described later using the flowchart of FIG. 7.

Here, a set of viewpoint information that is used in the animation display of the image that has been displayed in S601 changes depending on which one of the preset buttons 812 to 815 has been selected by the user. For example, when the preset button 812 has been selected, it is assumed that a set of viewpoint information that has been registered in S605 is applied to the image displayed in S601. When the preset button 813 has been selected, it is assumed that a set of viewpoint information that has been registered with respect to another image is applied. Accordingly, it can be said that, when selecting any of the preset buttons 812 to 815, the user selects as to whether a set of viewpoint information that has been applied to another image is applied to the image that has been displayed in S601.

In S607, the CPU 201 determines whether an operation other than the selective operation of the button icons has been performed on the operation unit 206. The processing proceeds to S608 when the operation other than the selective operation of the button icons has been operated. Otherwise, the processing proceeds to S609.

In S608, the CPU 201 performs processing according to the operation that has been performed in S607. For example, when a pinch-in operation or a pinch-out operation has been performed on the touch panel 206a in S607, the CPU 201 enlarges or reduces the displayed image.

In S609, the CPU 201 determines whether an ending operation has been performed on the operation unit 206. The processing of the flowchart ends when the ending operation has been performed. Otherwise, the processing proceeds to S603.

(Viewpoint Registration Processing: S605): The details of the viewpoint registration processing to register viewpoint information that is the processing performed in S605 will be described using the flowchart of FIG. 6B. Note that the flowchart is realized when the CPU 201 develops a program stored in the non-volatile memory 203 into the memory 202 and performs the same.

In S611, the CPU 201 performs initialization processing such as the hiding of the menu 810 displayed on the display 205 and the setting of the value of a viewpoint number n used to manage a viewpoint number at zero.

In S612, the CPU 201 determines whether an operation (display-range change operation) to change the display range of an entire celestial sphere image displayed on the display 205 has been performed. The processing proceeds to S613 when the display-range change operation has been performed. Otherwise, the processing proceeds to S621.

In S613, the CPU 201 changes a display range that is to be displayed on the display 205 in the entire celestial sphere image according to the display-range change operation received in S612. For example, when a touch-move has been performed as the display-range change operation, the CPU 201 changes the position of the display range without changing the size (display magnification) of the display range. This operation is performed by a scroll display based on the touch-move. Further, when a pinch-in/pinch-out operation has been performed as the operation to change the display range, the CPU 201 changes the size (display magnification) of the display range. On this occasion, since the middle point between two touch positions to perform the pinch operation is regarded as the reference (center) of enlargement/reduction, the center of the enlargement/reduction may not correspond to the center of the display range. In this case, the central position of the display range with respect to the whole of the entire celestial sphere image also changes with the enlargement/reduction. When the display range is changed, information such as the central position (coordinates in the omnidirectional image) of the changed display range and a display magnification is recorded on the memory 202 as information showing the changed display range.

In S621, the CPU 201 determines whether a viewpoint registration operation has been performed on the operation unit 206. The processing proceeds to S622 when the registration operation has been performed. Otherwise, the processing proceeds to S625.

In S622, the CPU 201 increments (increases) the viewpoint number n by one.

In S623, the CPU 201 acquires subject information within a display range (hereinafter called a partial image) that is displayed on the display 205 at the present moment.

Note that the subject information in the present embodiment is information showing the type of a subject. For example, the information showing the type of a subject is information showing at least one of the face of a person, the portion (such as the upper body, the hand, the whole body, and the eyes) of a person, an animal (such as a dog, a cat, and a bird), a vehicle (such as a bike, an airplane, and a train), and a character string and is information showing whether the subject is included. Further, the information showing the type of a subject may be information having the shape of an edge extracted from an image. Using information on the shape of an edge extracted from an image, it is possible to estimate, for example, a plate on which food is dished up. In addition, the subject information may include information such as the number of subjects, the relative position of a subject in a partial image, the ratio of the area of a subject to a partial image. Note that the CPU 201 may acquire the subject information from a determination result using detection such as pattern matching or metadata (information) associated with an image.

In S624, the CPU 201 stores the viewpoint position of a displayed image (a partial image; a display range associated with a viewpoint) and the subject information that has been acquired in S623 in the memory 202 as the n-th viewpoint so as to be associated with each other. Here, the viewpoint position is information (position information) based on the information that has been recorded on the memory 202 in S613 and includes coordinates (a position) and a display magnification (the size of the display range). That is, the CPU 201 registers viewpoint information in a management table (a set of information on a plurality of viewpoints) as shown in FIG. 8B that is stored in the memory 202. Further, the coordinates may be coordinates with respect to the central point of a partial image (display range) or the omnidirectional image. For example, the coordinates may be the coordinates of an arbitrary position such as the upper-right position and the lower-left position of the display range with respect to the omnidirectional image so long as the position of the partial image is specifiable. In the management table shown in FIG. 8B, the "presence or absence of a face" is the "subject information". Note that the numeric values of "viewpoints" shown in FIG. 8B are also display orders when animation is displayed and therefore correspond to the display orders (specification orders) of the viewpoints.

In S625, the CPU 201 determines whether at least two viewpoints are registered in the management table. The processing proceeds to S626 when the at least two viewpoints are registered. Otherwise, the processing proceeds to S630.

In S626, the CPU 201 determines whether an editing operation to edit the animation has been performed on the operation unit 206. The processing proceeds to S627 when the editing operation has been performed. Otherwise, the processing proceeds to S628.

In S627, the CPU 201 registers the "movement between viewpoints" in the management table according to the editing operation that has been performed in S626. Here, the "movement between viewpoints" corresponds to "movement to a next viewpoint" in the management table shown in FIG. 8B. The "movement to a next viewpoint" can be information on the transition of a partial image (display range) between viewpoints such as a movement route between viewpoints, a movement speed, and a switching method. Note that the processing of S626 and S627 may not be performed when one "movement between viewpoints" is set in advance with respect to all the viewpoints.

In S628, the CPU 201 determines whether a saving operation to save the viewpoint information has been performed on the operation unit 206. The processing proceeds to S629 when the saving operation has been performed. Otherwise, the processing proceeds to S630.

In S629, the CPU 201 registers the information (a set of the viewpoint information) on the management table in the non-volatile memory 203 as preset information (controls (memory control) the information so as to be stored). Note that the preset information registered in the non-volatile memory 203 may be registered as new information. Further, the preset information registered in the non-volatile memory 203 may be overwritten on present information previously registered in the non-volatile memory 203. In S629, the preset information is registered in the non-volatile memory 203 so as to correspond to any of the preset buttons 812 to 815 in the menu 810 shown in FIG. 8A.

In S630, the CPU 201 determines whether an ending operation has been performed on the operation unit 206. The viewpoint registration processing ends when the ending operation has been performed. Otherwise, the processing proceeds to S612.

(Animation Display Processing: S606): Hereinafter, the details of the animation display processing that is the processing performed in S606 will be described using the flowchart of FIG. 7. The flowchart is realized when the CPU 201 develops a program stored in the non-volatile memory 203 into the memory 202 and performs the same. Note that a case in which the "presence or absence of a face" is registered as subject information will be described as an example below.

In S701, the CPU 201 reads preset information (a set of viewpoint information) corresponding to a preset button (any of the preset buttons 812 to 815) that has been selected in S603 from the non-volatile memory 203. Further, the CPU 201 performs initialization processing such as the hiding of the menu 810 and the setting of the value of a variable i used to manage viewpoints to be processed at zero.

In S702, the CPU 201 determines whether the variable i is not more than the number of viewpoints (the total number of the viewpoints) shown by the preset information. The processing proceeds to S703 when the variable i is not more than the total number of the viewpoints. Otherwise, the processing proceeds to S709. For example, in the case of preset information corresponding to the management table as shown in FIG. 8B, the total number of viewpoints is three.

In S703, the CPU 201 generates a partial image that corresponds to a display range from the image displayed in S601 on the basis of the i-th viewpoint position (the coordinates and the display magnification of the display range that are associated with a viewpoint) in the preset information. For example, when a partial image is generated from the entire celestial sphere image 500 shown in FIG. 5B on the basis of the viewpoint 401 (a range specified by information on a viewpoint position A in FIG. 8B), the partial image 511 obtained by cutting out a range corresponding to the viewpoint 401 from the entire celestial sphere image 500 is generated.

In S704, the CPU 201 acquires subject information (the presence or absence of a face) on the i-th viewpoint in the preset information and determines whether the "presence of a face" has been registered as the subject information. The processing proceeds to S705 when the "presence of a face" has been registered. Otherwise, the processing proceeds to S708. For example, when the preset information shown in FIG. 8B has been registered and the variable i is one, it may be determined that the "presence of a face" has been registered as the subject information.

In S705, the CPU 201 determines whether a "face" (a subject shown by the subject information) is present in the partial image. The processing proceeds to S708 when the "face" is present in the partial image. Otherwise, the processing proceeds to S706. For example, the CPU 201 determines that a "face" is present in the partial image 511 shown in FIG. 5C and determines that a "face" is not present in the partial image 512 shown in FIG. 5C.

Figure 9A:
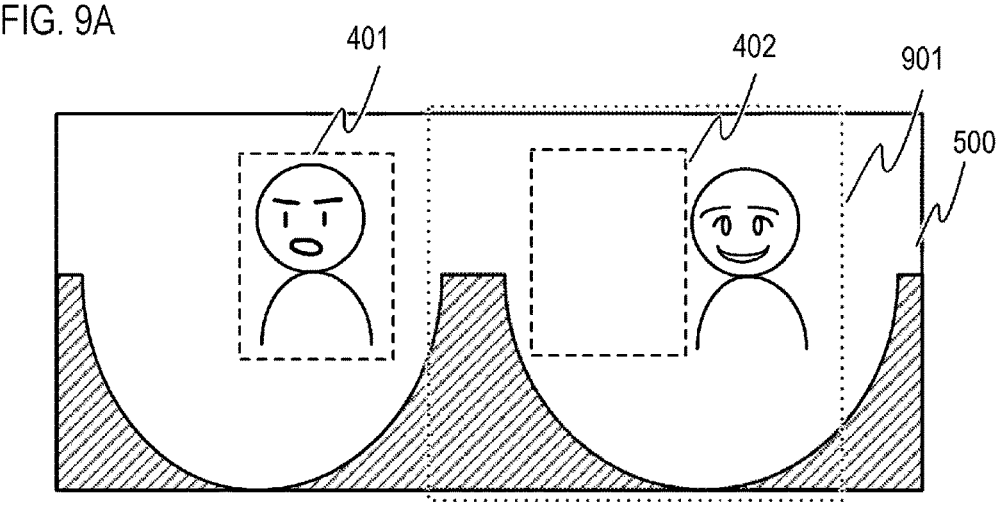
FIGS. 9A to 9C are views for illustrating an animation display.

In S706, the CPU 201 determines whether a "face" (a subject shown by the subject information) is present in a range (hereinafter called an enlarged range) wider than a range shown by the viewpoint position at which the partial image is generated. The processing proceeds to S707 when the "face" is present in the enlarged range. Otherwise, the processing proceeds to S708. For example, when a "face" is not present in a partial image generated from a viewpoint 402 (a range specified by information on a viewpoint position B in FIG. 8B), the CPU 201 determines whether a "face" is present in an enlarged range 901 that is a range around the viewpoint 402 as shown in FIG. 9A. Note that the enlarged range 901 may be a range obtained by multiplying the range of the viewpoint 402 by a predetermined number about the range shown by the viewpoint 402 or may be a range obtained by enlarging the range of the viewpoint 402 by a predetermined value in vertical and horizontal directions. Further, the CPU 201 may regard a range obtained by enlarging the range of the viewpoint 402 up to a position at which a face is present as an enlarged range.

Figure 9B:
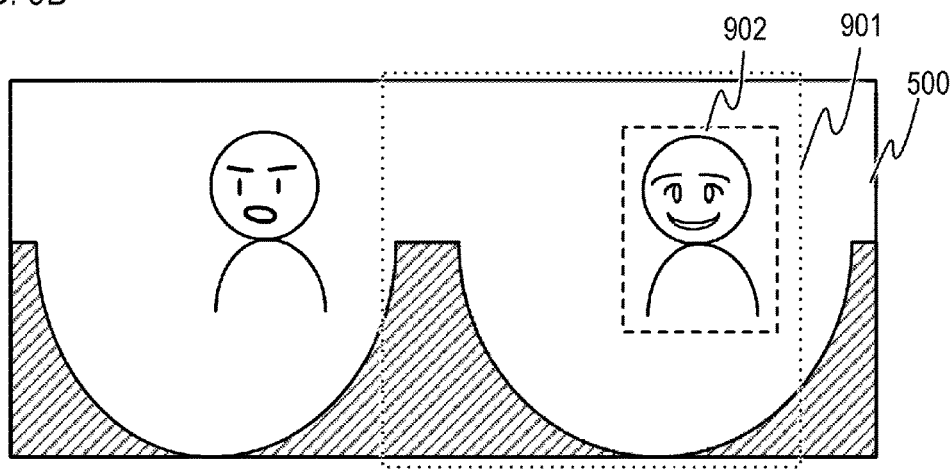
Figure 9C:
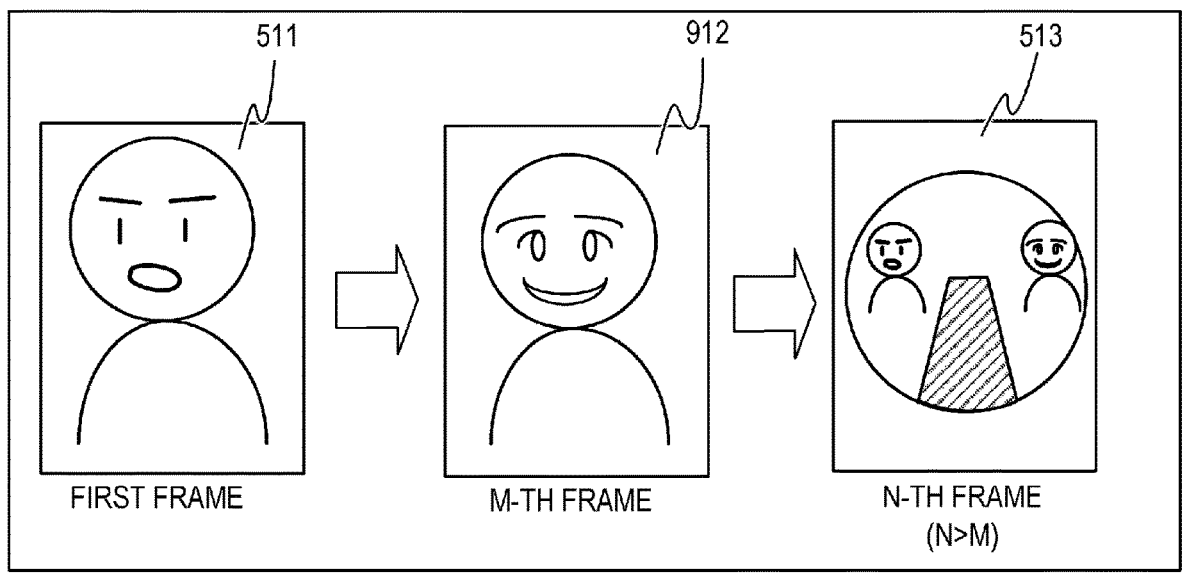

In S707, the CPU 201 changes the viewpoint position (the partial image, the display range) (performs correction processing) so as to include the face (subject) that has been detected in S706. Accordingly, any or both of coordinates and a display magnification are changed from the display range before the change of the viewpoint position shown by the information on the viewpoint position that is recorded on the preset information to a display range after the change of the viewpoint position. For example, since the face of a person is present in the enlarged range 901 as shown in FIG. 9B, the viewpoint 402 is changed to a viewpoint 902 so as to include the face. Then, as shown in FIG. 9C, the CPU 201 generates a partial image 912 on the basis of the viewpoint 902 after the change. Note that the "change of a viewpoint" here does not represent the update (overwrite) of preset information stored in the non-volatile memory 203 but represents the change of a viewpoint position temporarily stored in the memory 202 to generate a partial image.

Note that the CPU 201 may determine whether to change a viewpoint position (partial image) according to the selection of the user. For example, the CPU 201 notifies the user of a message like "An image not including a subject will be displayed if you directly apply viewpoint information. Do you change settings to include the subject?" Then, the CPU 201 determines whether to change the viewpoint position depending on which of "positive" and "negative" operations the user has performed in response to the message. That is, the CPU 201 changes (corrects) the viewpoint position when the user has selected the "positive" operation (an operation to perform the correction). The CPU 201 does not change a display range shown by information on the viewpoint position when the user has selected the "negative" operation.

In addition, when a viewpoint position has been changed, the CPU 201 may display preset information used at that time on the display 205. Thus, the user is allowed to easily understand the fact that a display range (partial image) shown by the preset information has been changed.

Note that when subject information includes the ratio of the area of a subject to a partial image or the relative position of the subject in the partial image, the CPU 201 may change a viewpoint position so as to (match) correspond to the ratio or the position shown by the subject information. For example, the CPU 201 changes a viewpoint position to generate the partial image 912 so that the area of the subject in the partial image 412 shown in FIG. 4C and the area of the subject in the partial image 912 shown in FIG. 9C correspond to (are same as) each other. Similarly, the CPU 201 may change a viewpoint position to generate the partial image 912 so that the relative position of the subject in the partial image 412 shown in FIG. 4C and the relative position of the subject in the partial image 912 shown in FIG. 9C correspond to (are same as) each other.

Note that when the viewpoint position has been changed in S707, the preset information recorded on the non-volatile memory 203 may be overwritten so that the viewpoint position of the i-th viewpoint (the viewpoint of which the position has been changed) in the preset information used at that time shows the position of the changed viewpoint. Further, when the viewpoint position has been changed in S707, the preset information used at that time may not be rewritten but new preset information (a set of viewpoint information) showing a viewpoint position at which only the viewpoint position of the i-th viewpoint in the preset information used at that time is changed may be recorded on the non-volatile memory 203. The CPU 201 may determine whether to store the preset information reflecting the changed viewpoint position in the non-volatile memory 203 according to the operation of the user.

In S708, the CPU 201 increments the variable i by one. Then, the processing returns to S702 after the processing of S708 ends. That is, the processing of S703 to S708 is repeatedly performed by the number of viewpoints registered in the preset information. That is, a determination as to whether an appropriate subject is present in a partial image is made for each of the viewpoints. Then, when a subject is not present in a partial image, the CPU 201 changes a viewpoint position so as to show an appropriate subject if the appropriate subject is present around the subject.

In S709, the CPU 201 performs, on the basis of the preset information, the animation display of the partial images that have been generated in S703 to S707 on the display 205 according to information on the motion between viewpoints (the transition of a partial image between the viewpoints) in the registration order (specification order) of the images. Thus, animation display (moving-image display) like that described above using FIG. 9C is performed.

In S710, the CPU 201 determines whether moving-image export instructions to instruct the export of a moving-image file (an operation by the user to instruct the export) have been made. The processing proceeds to S711 when the export instructions have been made. Otherwise, the processing ends.

In S711, the CPU 201 records the moving image that has been displayed in S709 on the non-volatile memory 203 or the storage medium 208 as a general moving-image file. By exporting a moving-image file in the manner described above, it is possible to share generated animation so as to be reproduced by another apparatus or the like as a moving image.

According to the present embodiment, even when viewpoint information that has been set in a certain image so that one subject, another subject, and the two subjects are displayed in this order as shown in FIG. 4C is applied to another image, the other image is displayed in the same order as shown in FIG. 9C. In FIG. 9C, the image 511 is an image obtained by cutting out a range based on viewpoint information corresponding to the viewpoint 401 from the entire celestial sphere image 500 that is a static image. The image 912 is an image obtained by cutting out a range corresponding to the viewpoint 902 obtained by correcting the viewpoint 402 from the entire celestial sphere image 500 that is a static image. The image 513 is an image obtained by cutting out a range based on viewpoint information corresponding to the viewpoint 403 from the entire celestial sphere image 500 that is a static image. Animation shown in FIG. 9C represents an animation display that is visually recognized as a moving image that displays the image 511 as the first frame, the image 912 as the M-th frame, and the image 513 as the N-th frame. In the frames between the first frame and the M-th frame, images in ranges cut out from the image 500 so as to smoothly change (change stepwise) from the range based on the viewpoint 401 to the range based on the viewpoint 902 are displayed. In the frames between the M-th frame and the N-th frame, images in ranges cut out from the image 500 so as to smoothly change (change stepwise) from the range based on the viewpoint 902 to the range based on the viewpoint 403 are displayed. Thus, when the user registers viewpoint information as shown in FIG. 4C, framing is realized with attention paid to persons so that video changes from the display range of person A to the display range of person B and then changes to the display range of both the person A and the person B. That is, as shown in FIG. 5C, a possibility that a subject desired by the user is omitted in a certain scene (M-th frame) and an animation display having a configuration desired by the user is not obtained may be reduced.

Figure 7:
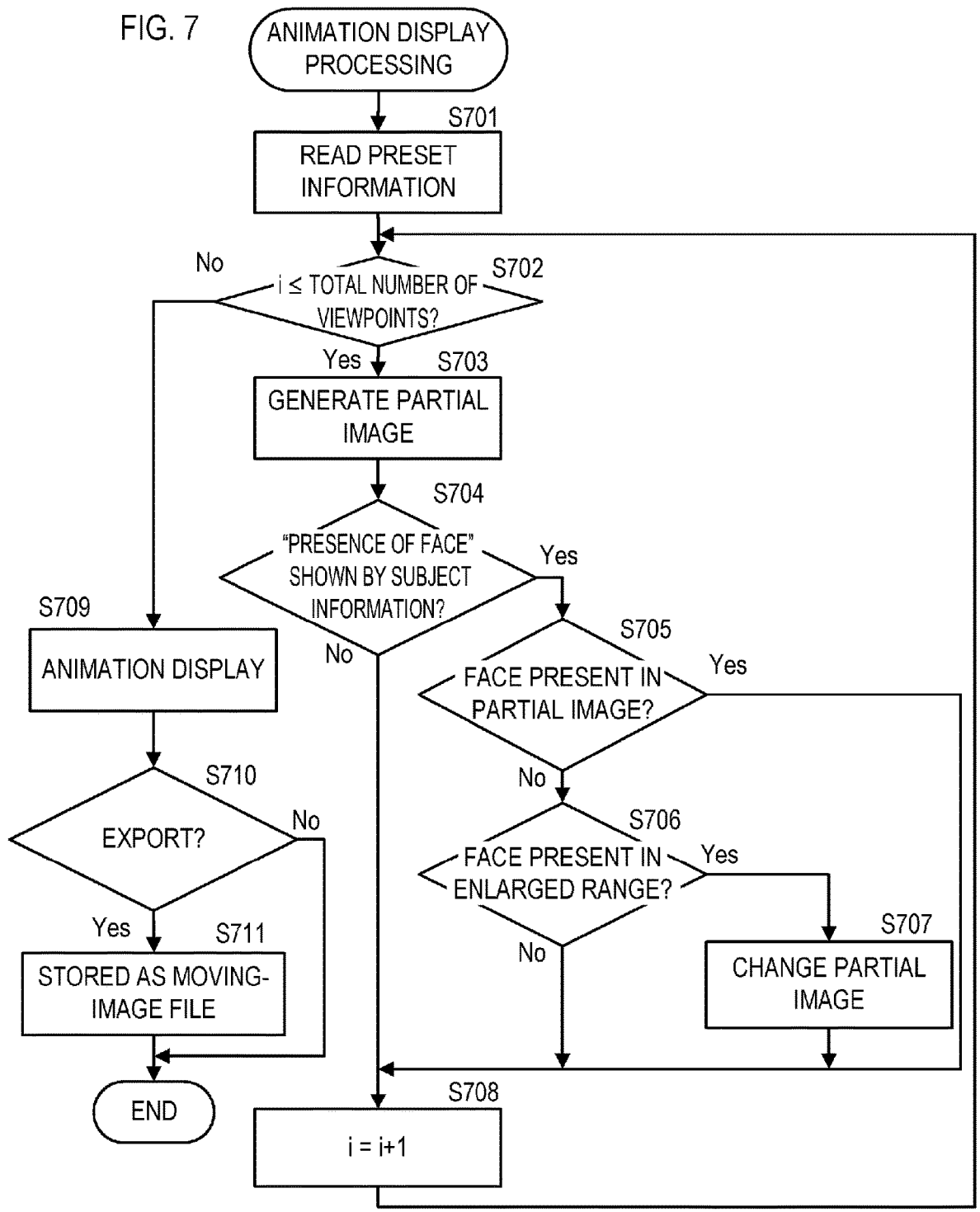
FIG. 7 is a flowchart showing animation display processing.

Note that the processing of the flowchart of FIG. 7 describes a case in which preset information includes the presence or absence of a face (the face of a person) as subject information. However, it is also possible to perform the same processing even when preset information includes the presence or absence of a person, the presence or absence of an animal, the presence or absence of an object, the presence or absence of a predetermined portion (part) of a person, or the like.

Further, in a case in which preset information includes information showing a subject and the number of the subjects as subject information, the processing proceeds to S705 when target subject information shows the presence of at least one subject in S704. Otherwise, the processing proceeds to S708. In S705, the processing proceeds to S708 when a partial image includes predetermined number (which is the number of the subjects shown by target subject information) of subjects shown by target subject information. Otherwise, the processing proceeds to S706. In S706, the processing proceeds to S707 when an enlarged range includes the predetermined number (which is the number of the subjects shown by target subject information) of subjects shown by target subject information. Otherwise, the processing proceeds to S708. In S707, the CPU 201 changes the position of a viewpoint within an enlarged range so as to show a range in which the predetermined number (which is the number shown by the subject information) of the subjects (which is shown by target subject information) is present. Note that other processing is the same as that of a case in which subject information shows the "presence or absence of a face". Thus, using, for example, viewpoint information including three subjects in a partial image of a certain image, it is possible to perform an animation display including three subjects in a partial image of another image.

Note that the above embodiment describes a case in which an image to which viewpoint information (preset information) is applied is an entire celestial sphere image that is a static image. However, viewpoint information may be applied to an arbitrary image. For example, when preset information is applied to an entire celestial sphere image that is a moving image, animation (moving image) in which ranges cut out from the entire celestial sphere image that is a moving image on the basis of information on a plurality of viewpoints included in the preset information are connected to each other may be generated. Further, an image to which viewpoint information (preset information) is applied may be a general rectangular captured-image or a VR image having a video range of less than 360 degrees such as an image captured by a fish-eye lens.

Further, the user may more easily select an image on which the animation display processing (processing to apply preset information) is to be performed, other than the image displayed in S601. Specifically, in S701, the CPU 201 retrieves an image of preset information that includes a subject shown by subject information from the non-volatile memory 203 when reading the preset information. Then, the CPU 201 determines whether to apply the preset information to one or a plurality of images that are stored in the non-volatile memory 203 and include the subject shown by the preset information according to the selection of the user. Here, when the user selects the application of the preset information to all the images, the processing of S702 to S709 is performed on all the images. Thus, it is possible to apply preset information in a lump to an image including a subject shown by the preset information.

Note that the CPU 201 may determine whether to apply preset information to each of one or a plurality of images that are stored in the non-volatile memory 203 and include a subject shown by the preset information according to the selection of the user. In this case, the CPU 201 may display the one or the plurality of images that are stored in the non-volatile memory and include the subject shown by the preset information on the display 205 in a list form. Then, the user who has watched the list-display selects an image to which the preset information is to be applied, and the CPU 201 performs the animation display (processing to apply the preset information; S702 to S709) on the selected image.

Note that the above various control that is to be performed by the CPU 201 may be performed by one hardware or a plurality of hardware (for example, a plurality of processors or circuits) may share the processing to control the whole apparatus.

Information that has been applied to one image to perform an animation display may be used in the animation display of another image.

Further, the present invention is described in detail on the basis of the preferred embodiments. However, the present invention is not limited to such specific embodiments and includes various modes without departing from the spirit of the present invention. In addition, each of the above embodiments shows only one embodiment of the present invention, and it is possible to appropriately combine the respective embodiments together.

Further, the above embodiments describe, as an example, a case in which the present invention is applied to a display control apparatus. The present invention is not limited to the example but is applicable to an electronic apparatus so long as the electronic apparatus is capable of controlling an image that is to be displayed. That is, the present invention is applicable to a personal computer, a PDA, a mobile telephone terminal, a mobile image viewer, a printer apparatus including a display, a digital photo frame, a music player, a video-game machine, an electronic-book reader, or the like.

<Other Embodiments>: Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-040817, filed on Mar. 10, 2020, which is hereby incorporated by reference herein in its entirety.

What is claimed is:

1. An electronic apparatus comprising:
a memory storing instructions; and
a processor that executes the instructions to:
  acquire a VR image;
  read viewpoint information indicating a position of a viewpoint a predetermined subject associated with the viewpoint, and an order;
  determine part of the VR image corresponding to:
    a first range specified based on the position of the viewpoint, in a state where the first range includes the predetermined subject; and
    a second range, which corresponds to the first range that is corrected so that the second range includes the predetermined subject, in a state where the first range does not include the predetermined subject; and
  control automatic switching and displaying of a plurality of determined parts of the VR image according to the order indicated in the viewpoint information on a screen.

2. The electronic apparatus according to claim 1, wherein the second range corresponds to the first range corrected by at least one of changing a position of the first range or enlarging an area of the first range.

3. The electronic apparatus according to claim 2, wherein:
the viewpoint information indicates presence or absence of the predetermined subject for the viewpoint, and
the processor determines the part of the VR image corresponding to the first range in a state where the viewpoint information indicates absence of the predetermined subject in the viewpoint.

4. The electronic apparatus according to claim 1, wherein the VR image is an image having a visual-field range of 360 degrees or 180 degrees.

5. The electronic apparatus according to claim 1, wherein:
the processor further executes the instructions to:
  control displaying of an area of a first VR image on the screen;
  detect a posture of the electronic apparatus or operation on a touch panel on the screen;
  change the area of the first VR image displayed on the screen according to the detected posture or operation; and
  store, in association with the viewpoint information, the position of the viewpoint, which corresponds to the area of the first VR image displayed on the screen, and the predetermined subject that exists in the area of the first VR image,
the acquired VR image is a second VR image different from the first VR image.

6. The electronic apparatus according to claim 5, wherein the viewpoint information indicates presence or absence of the predetermined subject at the viewpoint according to the presence or absence of the predetermined subject in the area of the first VR image displayed on the screen.

7. A control method for an electronic apparatus, the control method comprising:
acquiring a VR image;
reading viewpoint information indicating a position of a plurality of viewpoint, a predetermined subject associated with the viewpoint, and an order;
determining part of the VR image corresponding to:
  a first range specified based on the position of the viewpoint, in a state where the first range includes the predetermined subject; and
  a second range, which corresponds to the first range that is corrected so that the second range includes the predetermined subject, in a state where the first range does not include the predetermined subject; and
controlling automatic switching and displaying of a plurality of determined parts of the VR image according to the order indicated in the viewpoint information.

8. A non-transitory computer-readable storage medium storing a computer program executable by a computer to execute a control method comprising:
acquiring a VR image;
reading viewpoint information indicating a position of viewpoint, a predetermined subject associated with the viewpoint, and an order;
determining part of the VR image corresponding to:
  a first range specified based on the position of the viewpoint, in a state where the first range includes the predetermined subject; and
  a second range, which corresponds to the first range that is corrected so that the second range includes the predetermined subject, in a state where the first range does not include the predetermined subject; and
controlling automatic switching and displaying of a plurality of determined parts of the VR image according to the order indicated in the viewpoint information.

9. The electronic apparatus according to claim 1, wherein the predetermined subject is a person.

* * * * *